2,212,973
Patented Oct. 19, 1965

3,212,973
DODECABROMOPENTACYCLODECANE AS AN X-RAY OPAQUE AGENT
Carleton W. Roberts and Maynard B. Chenoweth, Midland, Mich., assignors to The Dow Chemical Company, Midland, Mich., a corporation of Delaware
No Drawing. Filed Sept. 13, 1961, Ser. No. 137,726
8 Claims. (Cl. 167—95)

The present invention is concerned with radiography and is particularly directed to a new and highly advantageous X-ray opaque agent adapted to be used in the fluoroscopic study of discontinuous matter, especially such matter of which differential internal movement is to be studied; and to X-ray photography of such matter. Similarly, the present invention is directed to the protection, from X-rays, of matter potentially exposed to X-rays, from which it is desired to exclude such radiation.

According to the present invention it has been discovered that the compound, perbromopentacyclo $$(5,2,1,0^{2,6},0^{3,9},0^{5,8})$$

decane, possesses extraordinary opacity to the passage of X-rays. Moreover, the compound has remarkably little tendency to refract or disperse X-rays incident upon it, so that, by its use, it is possible to elicit remarkable structural detail in the structures studied under X-ray with its aid. Moreover, by the conjoint use of the present X-ray opaque agent with two or more X-ray source positions in chosen angular relationship to one another it is possible to elicit stereoscopic X-ray views in remarkable detail.

Thus, more exactly stated, the present invention includes the method of interfering with the passage of X-rays which comprises the step of introducing a radiopaque amount of perbromopentacyclo $(5,2,1,0^{2,6},0^{3,9},0^{5,8})$ decane, otherwise called dodecabromopentacyclo $$(5,2,1,0^{2,6},0^{3,9},0^{5,8})$$

decane into the path of the said X-rays. It will be evident to those skilled in the arts of radiography that the present method is particularly advantageous when the radiopaque agent is introduced into a space interior to a relatively radio-transparent structure which space is normally hidden from view, whereby, as the radiopaque agent occupies the said space it makes possible the radiographic study of the shape, size, and the other factors of the said interior space. Such space may, if desired, be a space interior to the body of a warm-blooded animal; the space may normally be open as in the instance of a normal sinus or it may be normally collapsed and susceptible of distension under the pressure of introduced radiopaque agent and vehicle therefor and the like.

Because of the radiopaque agent of the present invention is of essentially very low solubility and very low toxicity, a composition of matter is readily prepared to obstruct the passage of X-rays through parts of the body of a warm-blooded animal, such composition comprising dodecabromopentacyclo $(5,2,1,0^{2,6},0^{3,9},0^{5,8})$ decane in a radiopaque amount. When it is desired to study voids or spaces interior to inner structures or in areas where ingestibility and harmlessness of the vehicle are not major factors, the ingestibility of the vehicle or excipient substance is a matter of indifference, or such substance may be chosen purely with respect to the behavior of its physical properties and without regard for its toxicity.

When it is desired to exhibit the radiopaque properties of the present radiopaque agent in a shape which more or less permanently conforms to the shape of an interior space; or when it is desired to be able to shape or form radiopaque agents in desired shapes, this may be accomplished by disposing or distributing the said radiopaque agent in and upon a resinous thermoplastic excipient material, which may thereafter be formed as desired.

When it is desired to employ the present radiopaque agent in paper, fabric, or the like, the radiopaque agent in finely divided form may be dispersed in a fluid which may be imbibed into an absorbent fibrous material such as paper, fabric, cotton linters, cellulose pulp sheets, wood or wood veneer, and the like; the employed fluid dried by vaporization and the like, and the resulting product impregnated with the radiopaque agent of the present invention employed as a protective wrapper by means of which to exclude X-rays from areas and sites from which it is desired that they be excluded.

However the present radiopaque agent may be disposed and however the present invention practiced, it will be apparent that a zone may be protected from undesired X-ray exposure by interposing between an X-ray source and the said zone a composition of matter comprising dodecabromopentacyclo $(5,2,1,0^{2,6},0^{3,9},0^{5,8})$ decane in a radiopaque amount. Exactly what amount is a satisfactorily radiopaque amount will depend upon the duration of exposure, the permissible transmission of X-rays, characteristic of the employed X-rays and the like; now that the extraordinary radiopacity of the present compound has been discovered, those skilled in the art will have no difficulty in the conduct of simple range-finding experiments, if necessary, by means of which to ascertain what amount of the said compound exhibits the desired radiopacity. The novel X-ray opaque compound corresponds to the formula

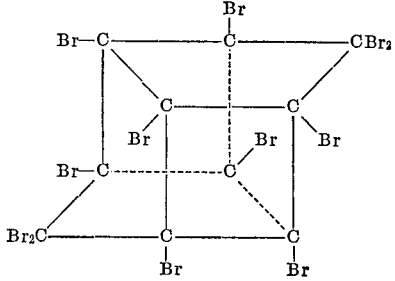

The radiopaque agent of the present invention is prepared by the simultaneous condensation and bromination of hexabromocyclopentadiene. Hexabromocyclopentadiene is readily prepared in the manner of Straus, Kollek, and Heyn, in Berichte der deutschen chemischen Gesellschaft, volume 63B, page 1808 (1930). When purified, hexabromocyclopentadiene is a yellow, crystalline, normally solid substance melting at 86.5–88° C., stable at and near its melting temperature.

*Example 1.—Preparation of perbromopentacyclo $(5,2,1,0^{2,6},0^{3,9},0^{5,8})$ decane*

In a 500 milliliter three-necked round-bottomed flask equipped with stirring means, reflux condenser protected protected with drying tube, heating means, and means for imposing sub-atmospheric internal pressure, were placed 107.9 grams (0.2 mole) recrystallized hexabromocyclopentadiene.

To the dry flask and contents were then added 400 grams (approximately 5 gram-equivalent weights) of liquid bromine, which had been freshly dried by shaking with, and separation from, concentrated sulfuric acid.

To the mixture of bromine and hexabromocyclopentadiene was then added 90 grams aluminum bromide and the resulting mixture was refluxed (at about 60° C.) for 4.5 hours to carry to completion a reaction to prepare the desired product. At the conclusion of the reflux heating time, the reaction flask was cooled in an ice bath and, when the cooling had reduced the internal temperature to a temperature not much above room temperature, 100 milliliters water was added slowly and cautiously. The addition of water resulted in the hydrolysis of the aluminum bromide catalyst. Thereafter, the interior of the flask and its contents were placed under slightly subatmospheric pressure and thus maintained overnight to vaporize and remove most of the bromine and water at room temperature. There remained in the flask, upon removal of bromine and water, a solid black residue. This residue was removed and washed with ethanol, and the washed product was then eluted with a large excess of benzene for a period of 20 hours. The benzene dissolved substantially all of the desired product, to give a dark-colored benzene solution thereof. This benzene solution was then boiled for a period of time with an activated charcoal decolorizing agent, filtered to remove charcoal and sorbed impurities, and from the resulting almost decolorized solution, solvent was vaporized and removed by gentle heating. Removal of the benzene solvent left behind a solid perbromopentacyclo $$(5,2,1,0^{2,6},0^{3,9},0^{5,8})$$

decane product as a light-colored crystalline solid. This solid was dissolved in tribromofluoromethane and recrystallized therefrom to obtain fine white crystals of the desired perbromopentacyclo $(5,2,1,0^{2,6},0^{3,9},0^{5,8})$ decane, melting with decomposition at 340° C. The yield of finely purified product was 32.2 percent by weight of starting hexabromocyclopentadiene. Upon analysis, the product was found to be approximately 99.9 percent pure. The product opaque agent of the present invention is also accurately named as a dodecabromopentacyclodecane.

Perbromopentacyclo $(5,2,1,0^{2,6},0^{3,9},0^{5,8})$ decane is useful as an X-ray opaque agent in such X-ray techniques as radiography and fluoroscopy. In such use, the compound combines extraordinary opacity and, for various reasons, offers the possibility of the resolution of extraordinary detail, such detail usually being limited, with the use of the present opaque agent, by the collimation of the X-ray beam employed, or the techniques for distribution of the said agent. Thus, the present radiopaque agent is extraordinarily well-adapted to be used in such techniques as microradiography and the like. In such use, the unmodified compound may be employed. Also, the compound may be dissolved in solvents and the resulting solvent solutions employed either directly or by vaporization of solvent and subsequent deposition of the desired compound unmodified. Also, such solvent solutions may be dispersed with or without the aid of a wetting agent in water or other carrier liquid or may be dispersed in and upon a finely divided solid carrier. Also, the compound, usually in finely divided form, may be dispersed in a viscous vehicle of which the viscosity may be controlled from nearly liquid through slow-pouring liquid to pastes and near-solids. In some applications the employment of non-Newtonian fluids selected for their possession of desired properties, may be particularly advantageous. In any event, the use of vehicle or carrier, if any, is of value solely to achieve desired distribution of the radiopaque compound in and upon structures which it is desired to study by differential X-ray transmission. However, disposed or placed, the perbromopentacyclo $(5,2,1,0^{2,6},0^{3,9},0^{5,8})$ decane compound is opaque to incident X-rays in proportion to the amount of the said compound lying in the path of incident X-rays; with the result that it is readily used qualitatively or quantitatively in applications dependent on the absorption of X-rays.

In view of the foregoing discussion, it will be apparent to those skilled in the radiographic arts, that the X-rays opaque agent of the present invention may be usefully employed not only as a contrast agent in radiographic and fluoroscopic techniques, but also as a protective agent to protect from X-ray radiation, anything which is potentially exposed to such radiation and should be protected therefrom. In view of the discovery of the remarkable radiopacity of the present agent, it will be apparent that, in exploiting this use, the present agent may be dispersed in a thermoplastic polymeric resinous material which may thereafter be formed into a block, slab, plate, sheet; or cut into strips; or extruded as a filament or fiber. Such sheet or strips or fiber may then be disposed in any desired manner, for example, the fibers may be knitted or woven into a fabric, whereby to exhibit the radiopacity over a desired site and in a desired construction. Also, solutions or single- or multiple-phase dispersions of the present agent may be distributed on and within the substance of a relatively absorbent fabric, for example, a heavy cotton flannel or a plurality of layers of cotton flannel, and, with or without the presence of solvent, thereafter employed as a mask or screen. Also, a cell which may be a relatively thin cell having walls transparent to X-rays, or to radiations of various wave lengths, as, for example, aluminum or flint glass walls, may contain an inner liquid contents layer which is a solution or dispersion of the present radiopaque agent and may be used for viewing, for example, fluoroscopic screens and the like, with the result that the visible light therefrom passes through relatively unimpeded (or, if desired, is stopped) whereas X-ray radiation which might be harmful to the viewer is intercepted.

When it is desired to protect X-ray film from stray radiation whereby miscellaneous unorganized darkening of the film would result, the said film may be wrapped in a package of which the wrapping material or materials contain, in radiopaque quantity, the present agent. Such wrapping materials may be a thermoplastic sheet of the sort previously described or may be a paper or fabric impregnated with the present agent by dispersion thereof in solution or suspension and thereafter soaking the said paper or fabric in said suspension or solution. Alternatively, such paper may be prepared in radiopaque form by inclusion of a radiopaque amount of the present agent in solution or suspension in the pulp slurry of which the paper is composed at the time the said paper is manufactured.

Similarly, the present radiopaque agent may be used in radiography in the human body. In such use, the present radiopaque agent permits fluoroscopic or radiographic studies in far more detail than is possible through the conventional use of barium compounds. Moreover, by reason of its greater opacity to the passage of X-rays, needed amounts of fluid contain smaller amounts of radiopaque agent when the present agent is employed with the result that products of highly satisfactory radiopacity are relatively more palatable than when employing conventional metallic salt radiopaque agents; and the ingested or introduced amount of fluid vehicle need be limited only by the requirement for mechanical dilatation of the site to be studied. The radiopaque agent of the present invention is of a relatively very low order of toxicity upon oral ingestion. It is also of very low solubility in natural alimentary fluids, autogenous or introduced, so that the radiopacity resulting from oral ingestion, rectal enema, and like introduction into a natural body cavity does not give rise to chemically or biologically selective opaqueing of organs or systems other than those within simple mechanical access.

It will be apparent to those skilled in the radiographic arts that the employment of the present radiopaque agent is by no means confined, in radiological studies of living animals, to the digestive tract but may, indeed, be employed wherever it is desired to define an opening, void, cavity, or the like, distended or not, as defined by living tissue or substance relatively transparent to X-rays. Because the present radiopaque agent is readily presented in sections of radiopacity substantially greater than that of bone, it is possible also to carry out bone X-ray studies by its use.

The following examples are illustrative, but are not to

Example 2

Three standard male laboratory rats otherwise unexceptional are deprived of food for eight hours. At the end of this time, there is administered to one of the rats 0.5 gram perbromopentacyclo$(5,2,1,0^{2,6},0^{3,9},0^{5,8})$decane dispersed in approximately 10 milliliters aqueous methyl cellulose gel comprising approximately one weight percent methyl cellulose in water. To a second rat there is administered a standard medical radiopaque suspension of barium sulfate. The third rat is maintained as a check. Both administrations are made by stomach tube. The rats are returned to cage liberty for 45 minutes and thereafter sacrificed and X-rayed. In the rat to which barium sulfate is administered, the outline of stomach and upper reaches of the small intestines can be discerned with the degree of contrast and detail that would be expected. In the rat to which the dodecabromopentacyclodecane compound is administered, the stomach and upper reaches of the small intestine can be discerned in great detail and, by delicate and highly detailed shading, the remainder of the small intestine and upper reaches of the colon are discerned. It is noted that the outline detail and especially the differential transmission detail in the rat to which the dodecabromopentacyclodecane is administered exhibits an unusually fine degree of resolution. Also, the said decane compound traverses a substantially more extensive portion of the alimentary canal. The check animal is routinely X-rayed but shows no unexpected internal opacity.

Example 3.—Stereoscopic X-ray technique

The rat of Example 1 to which the dodecabromopentacyclodecane is administered is further studied by known X-ray stereoscopic techniques. In particular, the rat is disposed laterally over a table of X-ray transparent substance closely beneath which X-ray film is mounted. An X-ray photograph is taken, employing a closely collimated X-ray beam directed through the body of the rat at an angle approximately 3½ degrees from normal in a transverse plane, and normal in a longitudinal plane. A second such photograph is taken at an angle of approximately 3½ degrees the other side of normal. The total seven degree angle between indicated points of view corresponds closely to standard interpupillary distance for stereoscopic viewing at approximately 20 inches from the subject.

The exposed films are developed and positive prints made therefrom; the positive prints are mounted behind stereoscopic viewing lenses and studied. As a result of these procedures it becomes possible to discern the distribution of the dodecabromopentacyclodecane suspension, within the body of the rat, stereoscopically and in excellent detail. In particular it is noted that the distribution of the aqueous methyl cellulose suspension of the said bromodecane compound is not uniform. Relatively small amounts of it, represented by finely detailed but low-density shadows, have traversed the gut to a distance approximately twice as far from the stomach as the distance to which the principal opaque mass has, with almost complete uniformity, moved.

Example 4.—Fluoroscopic Technique

A hamster is deprived of food for eight hours and thereafter is administered, by stomach tube, approximately 5 milliliters of aqueous methylcellulose suspension comprising approximately one weight percent methyl cellulose by weight of total suspension, with which is mixed 0.01 gram dodecabromopentacyclo$(5,2,1,0^{2,6},0^{3,9},0^{5,8})$decane The hamster is thereafter anesthetized by intravenous administration of a minimal intravenous dose of a barbiturate. Then the anesthetized hamster is placed on an X-ray transparent table, a fluoroscopic screen is placed above and an X-ray source below, and the distribution of the radiopaque methyl cellulose-dodecabromopentacyclodecane suspension is studied. Peristalsis appears to be seriously inhibited by the barbiturate anesthetic. The interior outline of the stomach is extraordinarily sharply defined. However, the employed amount of radiopaque material is sufficiently low that the organ outline is of shadow density on the fluoroscopic screen only moderately greater than that of the tissues bearing no radiopaque substance; shadow density of the stomach interior is approximately intermediate that of unshadowed tissue and normal bone.

Example 5

In the industrial production of a hollow plastic manufactured article having a continuous exterior surface, it is desired to ascertain uniformity of wall thickness and interior shape of the resulting article. Molding granules of thermoplastic resin (in particular, a high-impact, plasticized polystyrene-rubber mixture) is modified by the inclusion, within the said granules, during the process of their forming, of one percent by weight of resulting product of dodecabromopentacyclo $(5,2,1,0^{2,6},0^{3,9},0^{5,8})$decane as radiopaque agent. The resulting beads are employed in a standard injection-inflation molding technique whereby there is prepared a hollow air-inflated plastic float for use to activate the ball-cock of a flush toilet tank. The resulting article is seamless, hollow, and formed of a molding granule resin modified, as noted, by the inclusion of the radiopaque agent. X-ray photographs are taken of this object from various angles, to elucidate the interior structure and uniformity of wall thickness. By the use of quantitative comparison exposure strips it is possible to assess the X-ray absorption quantitatively and in simple calculations to calculate wall thickness. Interior outline detail of the hollow cavity is easily ascertained subjectively and is susceptible of precise measurement.

The radiopaque property of the compound of the present invention inheres in the molecular nature of the compound and is manifest wherever the compound is present, intercepting the path of the incident X-ray radiation. Therefore, the compound may be disposed in any convenient manner, either unmodified or with the aid of suspending, dispersing, or other agents intended to facilitate and render more convenient its mechanical disposition in respect to the object to be studied or the X-rays to be applied. When the employed solvent itself is unobjectionable, the compound may be employed in solution in such solvents as acetone, gasoline and kerosene, xylene, and 1,1,2-trichloroethane. Although the compound is not highly soluble in any solvent in which it has been tested to the date of the filing of the present specification and claims, so great is its opacity to X-ray radiation that solutions containing the said radiopaque agent in concentrations no greater than ½ of one percent afford satisfactory shadow detail for a wide range of uses. Also, as has hereinbefore been exemplified, the said radiopaque agent may be dispersed in a suspending agent which may be inert, or in the instance of the radiographic study of a living animal, may be a digestible substance.

Also, the radiopaque agent may be used for shielding or protection from X-ray radiation of regions otherwise exposed thereto, which it is desired to protect. For example, the perbromopentacyclodecane compound of the present invention may be dispersed in a wrapper material which may thereafter be used to protect X-ray film from the stray X-ray radiation. Also, such wrapper material or a salve comprising the present radiopaque agent in a viscous vehicle may be applied to areas of animal including human tissue which it is desired to protect from X-ray radiation. Thus, when it is desired to take generalized abdominal X-rays but not to occasion undue gonadal X-ray exposure, a desired region may be masked by the application of a sheet, film, solid body, salve or the like comprising the present radiopaque agent whereby to shadow from the X-rays a region which it is desired not to expose. The exact amount of radiopaque agent to be employed will, of course, be adjusted in terms of intended X-ray exposure, and other factors known to those skilled in the arts of radiology.

We claim:

1. The method of interfering with the passage of X-rays which comprises the step of introducing a radiopaque amount of dodecabromopentacyclo(5,2,1,0$^{2,6}$,0$^{3,9}$,0$^{5,8}$)decane into the path of the said X-ray.

2. Method of claim 1 wherein the radiopaque agent is introduced into a space interior to a relatively radio-transparent structure and normally hidden from view.

3. Method of claim 2 wherein the said radio-transparent structure is the body of a warm-blooded animal.

4. A composition of matter adapted to be used to obstruct the passage of X-rays comprising an excipient and dodecabromopentacyclo(5,2,1,0$^{2,6}$,0$^{3,9}$,0$^{5,8}$)decane in a radiopaque amount.

5. The composition of claim 4 wherein the excipient substance is harmlessly ingestible by a warm-blooded animal.

6. Composition of claim 4 wherein the excipient is a resinous thermoplastic material.

7. Composition of claim 4 wherein the excipient is an absorbent, fibrous material.

8. Method of protecting a zone from undesired X-ray exposure by interposing between an X-ray source and the said zone, a composition of matter comprising dodecabromopentacyclo(5,2,1,0$^{2,6}$,0$^{3,9}$,0$^{5,8}$)decane in radiopaque amount.

References Cited by the Examiner

UNITED STATES PATENTS

| 2,671,043 | 3/54 | Gilbert | 260—648 |
| 2,724,730 | 11/55 | Johnson | 260—648 |

OTHER REFERENCES

Angiology, August 1959, pages 207–213.

Lesser, Drug and Cosmetic Industry, July 1951, page 32.

JULIAN S. LEVITT, *Primary Examiner.*

MORRIS O. WOLK, FRANK CACCIAPAGLIA, JR., LEWIS GOTTS, *Examiners.*